United States Patent
McAlister

[15] 3,646,678
[45] Mar. 7, 1972

[54] DENTAL DRILL
[72] Inventor: Roy E. McAlister, 5285 North Red Rock Drive, Phoenix, Ariz. 85018
[22] Filed: Oct. 23, 1969
[21] Appl. No.: 868,757

[52] U.S. Cl. ................................................ 32/26
[51] Int. Cl. ................................................ A61c 1/10
[58] Field of Search .................... 77/53.3, 56; 32/28, 27, 33

[56] References Cited

UNITED STATES PATENTS

| 2,946,244 | 7/1960 | Maynard | 77/55.3 |
| 2,979,056 | 4/1961 | Wiseman | 32/33 UX |
| 3,451,134 | 6/1969 | Erickson et al. | 32/28 |

*Primary Examiner*—Robert Peshock
*Attorney*—Cushman, Darby & Cushman

[57] ABSTRACT

A dental drill for milling tooth animal and bone material wherein the burr removing the material is cooled by evaporation taking place at the burr-tooth interface as liquid continually supplied to that interface is evaporated due to reduced pressure caused by the turbine driving the burr and connection to a vacuum pump or similar device. The burr-turbine may be formed as a unitary member and back flushing of solution such as medicated liquids can be accomplished cyclically or at the operator's will by reversed flow through the passage removing the vapor resulting from the evaporation at the interface.

12 Claims, 6 Drawing Figures

PATENTED MAR 7 1972 3,646,678

INVENTOR
Roy E. McAlister

BY Cushman, Darby & Cushman
ATTORNEYS

INVENTOR
Roy E. McAlister

3,646,678

DENTAL DRILL

BRIEF DESCRIPTION OF THE PRIOR ART

The invention relates to a dental or surgical drill whereby the burr-tooth interface is cooled by liquid supplied to the interface and evaporated as it enters the reduced pressure area where material removal and consequent heating is occurring.

High speed drills for the fast and relatively painless removal of material, such as tooth material in dental applications, and bone structures in surgical operations, have been used increasingly in the last few years. Such devices, operating at relatively high speeds, have been shown to be quite satisfactory in painlessly removing a variety of different, hard body materials.

However, such high-speed drills generate considerable heat which is not adequately removed or dissipated during milling of the tooth or bone structure. This local heating can be quite intense and is of particular significance since it has been shown that most of the pain accompanying such operations results from overheating of the area from which the material is being removed. If the enamel temperature in a tooth, for example, can be prevented from rising, then virtually no pain at all is experienced in dental work with a high speed drill.

Accordingly, the present invention relates to a unique dental drill wherein provision is made for cooling the interface between the rapidly rotating mill and the tooth or bone material. This is accomplished, as discussed in greater detail below, by injecting liquid such as water into the region within the burr adjacent to the tooth surface or onto the burr-material interface. This region where the liquid is injected is maintained at a reduced pressure by means of a vacuum pump connected to the interior of the drill by means of suitable lines and by a rotating turbine which is driven by a source of compressed air to rotate the burr. The injected water is thus quickly vaporized, either entirely within the burr or within the burr and on the enamel or bone surface, and is quickly drawn away from the region and out through the line connected to the vacuum tube, carrying with it most of the heat generated at the burr-enamel interface, thereby maintaining the working area at a relatively low and stable temperature.

Even further, the line connected to the vacuum line may also be connected to a source of cooling or medicating liquid or the like so that by disconnecting the line to the vacuum pump and connecting that line to such a source, which also includes means to impel the medicated liquid through the vacuum line, the solution may be reverse flowed and forced through suitable apertures at the end of the burr to supply suitable solutions to the enamel or other surface. In fact, this reverse flow may be automatic so that the solution will be supplied at set intervals between which cooling by removal of the evaporating liquid takes place.

Even further, it is contemplated that the burr-turbine assembly will be made as a unitary member without collets or other holding devices to cause alignment problems and bearing wear. Such a unitary arrangement has been shown to be more satisfactory in milling, simpler in operation, more reliable and less expensive.

Many other purposes and objectives of the invention will become clear from the following detailed description of the drawings.

DETAILED DESCRIPTION OF THE DRAWINGS

Figure 1:
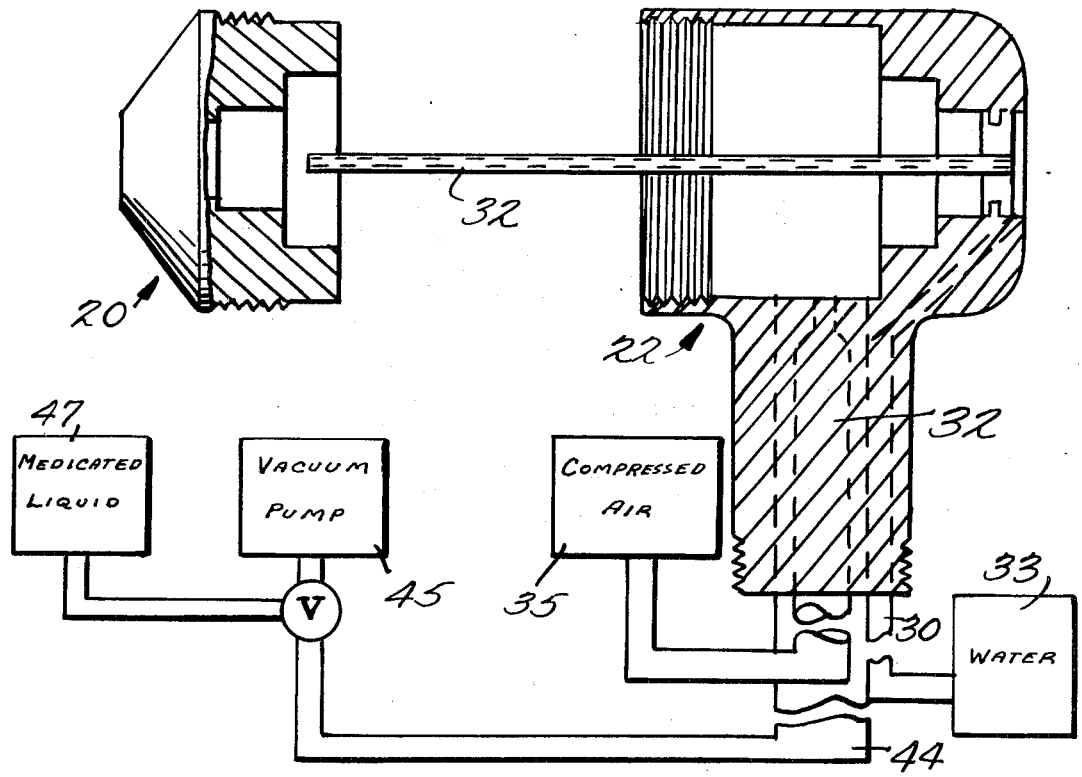
FIG. 1 shows a cutaway view of the upper portion of the dental drill with the turbine-burr assembly removed.
Figures 2, 4:
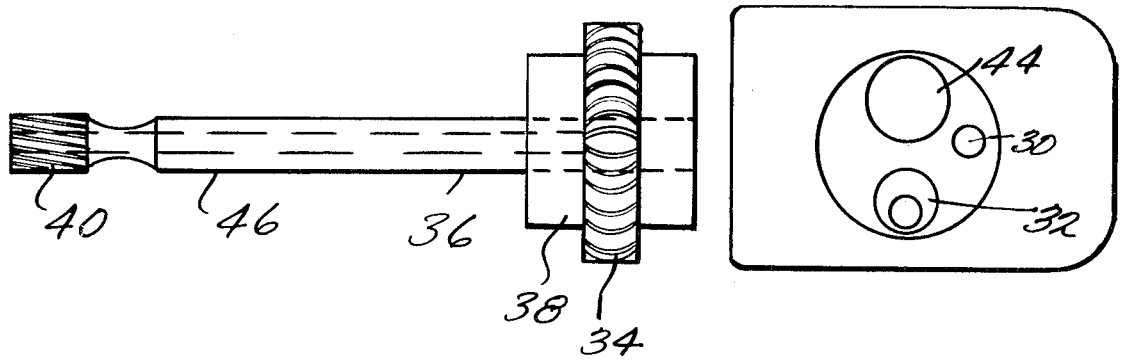
FIG. 2 shows an upper cutaway view of the upper portion of FIG. 1.
FIG. 4 shows the burr-turbine assembly which fits into the upper portion of FIG. 1.

Reference is now made to FIG. 1 which shows the upper portion of a hand held dental drill constructed according to this invention with the burr-turbine assembly removed for clarity and shown separately in FIG. 4. As shown, the upper portion or head of the drill is comprised of two parts 20 and 22, which are normally fitted together during operation but which can be separated as shown for removal of the burr-turbine assembly and for repair of the drill. The hollow head member 20, which is shown separated from the rear member 22, screws into member 22 as shown and a left-hand thread is preferably used to join the two members. The members 20 and 22 when joined form a hollow interior region into which burr-turbine assembly fits so as to protrude beyond the head member 20 during milling.

Three hollow lines, which may be constructed of plastic, rubber, etc., connect to the hollow interior within the joined members 20 and 22 into which a burr-turbine assembly, such as, assembly 36 shown in FIG. 4, fits. The first line 30 links a water pick tube 32 to a source of water or similar liquid 33 which forces the liquid by pressure up line 30 and through tube 32. As shown, tube 32 extends outwardly through the members 20 and 22, so that, when a burr-assembly is in place, tube 32 extends through the hollow center of that assembly at least to the end of the assembly which is in contact with the enamel surface. This line 30, which can also be seen in FIG. 2, preferably carries water or a similar liquid to tube 32 which then carries it to or adjacent to the burr-enamel interface where it is evaporated to cool the tooth being milled, as discussed in greater detail below. A second line 3 supplies compressed air from a source 35 to the hollow interior of joined members 20 and 22 and this air impinges directly upon the blades 34 of a turbine which comprises part of the burr-turbine assembly 36 shown in detail in FIG. 4. This compressed air impinging upon the blades 34 of the turbine causes the entire assembly 36 to spin rapidly upon bearings 38 at a speed dependent upon the velocity of the air incident upon the turbine blades 34, as well as the construction of assembly 36. The rotation of assembly 36 also, of course, spins the burr head 40 which is formed integrally as a part of the assembly 36 and this rotating burr head 40 is then placed in contact with a tooth in the same manner as conventional drills to remove the tooth material. The third hollow line 44 is preferably connected to a vacuum pump 45 and serves as an exhaust for the vapor produced by the evaporation of the liquid supplied through line 32 and may also remove other materials from the enamel surface, such as enamel chips, blood, saliva, etc.

Figure 5:
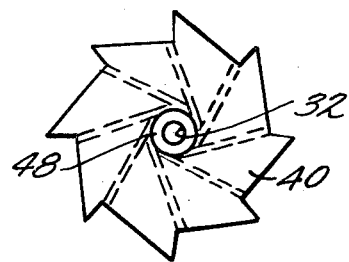
FIG. 5 shows an end view of the burr of FIG. 2.

Water or other suitable liquid is then supplied via lines 30 and 32 to the interior of the burr head 40, and is then injected into the region at the burr-enamel interface adjacent the end of the burr head 40, either directly through a single hole 48, as shown in FIG. 5, or through a plurality of apertures disposed in any suitable pattern about the end of the burr head 40. Because the interior of the burr head 40 and the region about the end of the burr head 40 in contact with the tooth enamel is maintained at a reduced pressure because of the vacuum pump 45 attached to the line 44 and because the turbine blades 34 are constantly forcing air, drawn or forced in through the inlet 32, out the exhaust line 44, the water which is injected from the line 32 is continually evaporated after injection and then moves as vapor through the hollow space 46, which surrounds the line 32 in the interior of the hollow burr-turbine assembly 36, back toward the line 44 through which it is then drawn toward the vacuum pump 45 connected thereto for suitable removal. If the liquid from line 32 impinges directly upon the enamel surface and is there evaporated rather than impinging just on the interior end wall of the head 40 as in FIG. 6, material removed by the high speed burr head 40, such as blood, enamel chips, saliva and healing or washing fluids applied by reversed flow as described below, may also be drawn back to line 44 and thus conveniently removed. This continuous evaporation and removal of freshly arrived liquid then quite efficiently cools the burr-tooth interface by carrying off the heat with the vapor.

Thus, the enamel surface is kept relatively cool with a consequent reduction in the moderate pain to the victim which the milling normally produces. Cooling is carried out precisely at the area which needs it, namely the burr-enamel interface, by evaporation of preferably water based fluids transforming in phase from a liquid at atmospheric pressure to a vapor at reduced pressure and then travelling through the hollow burr-turbine assembly 36 back toward vacuum line 44 to be permanently removed. Acceleration of particles by the flutes of the burr head 40 normally prevents clogging of the hollow passage 46 in the burr assembly 36 by tooth fragments and other matter.

Moreover, it should be noted that the novel turbine assembly shown in FIGS. 4 and 5 is formed as a unitary member with the turbine blades 34 on one end and the burr head 40 on the other. Such a unitary arrangement is especially desirable since it eliminates any possibility of misalignment such as frequently results between the burr head, collets and turbine in assemblies which are normally fastened together with a separate burr head and turbine assembly.

Moreover, this unitary arrangement eliminates construction expenses involving collet manufacture, collet tightening and aligning tools. Not only is this arrangement more economical, but because misalignment, which frequently causes tooth trauma during milling, is substantially eliminated, the use of a unitary burr-turbine assembly even further reduces pain inflicted upon the patient by the dental operator.

Figure 3:
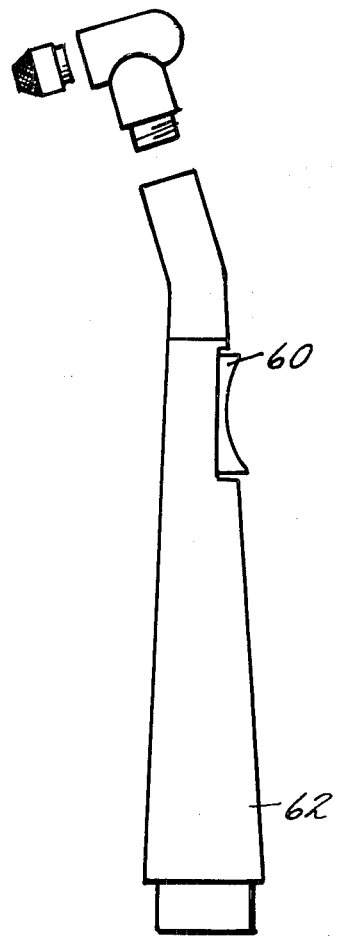
FIG. 3 shows an outside view of the dental drill.

Moreover, the novel arrangement shown in FIGS. 1–6 can easily be employed to either cyclically or periodically at the will of the operator inject healing or medicating fluids directly onto the burr-enamel interface and then remove those materials in the same way that the vaporized water from line 32 and the other materials generated by the milling are removed, namely by passage down the hollow interior 46 of assembly 36 to the line 44 which is connected to vacuum pump 45 to pull the vapor and other material down line 44 for disposal. This can be accomplished by connecting the line 44 to both vacuum pump 45 and to a suitable source or sources 47 of such medicating fluids or solutions and then disconnecting the vacuum pump by a valve V which may be a cyclic timer valve so that the medicating fluids are forced up the line 44, along the hollow passage 46 toward the burr head 40 and out the apertures or aperture in the end of the mill 40 onto the burr-enamel interface. This reverse flow may be automatic and periodic so that each second or at given intervals of time the vacuum pump 45 will be automatically disconnected by valve V and the source of medicating liquid 47 connected to line 44 to force the liquid down line 44 to the burr-enamel interface and thus apply the healing solution to the tooth. After a short interval the line 44 will be reconnected to the vacuum pump 45 and the liquid just supplied will be removed together with the vapor and other materials. Thus, with this arrangement, the medicating liquids will be periodically supplied to the tooth and then removed and the enamel surface cooled. As shown in FIG. 3, a simple switch 60 may be provided on the handle 62 to permit manual control and allow the operator to supply medicating liquids by means of the above described reverse flow through the line 44 at any time, and also to control the amounts of such liquids supplied.

Figure 6:
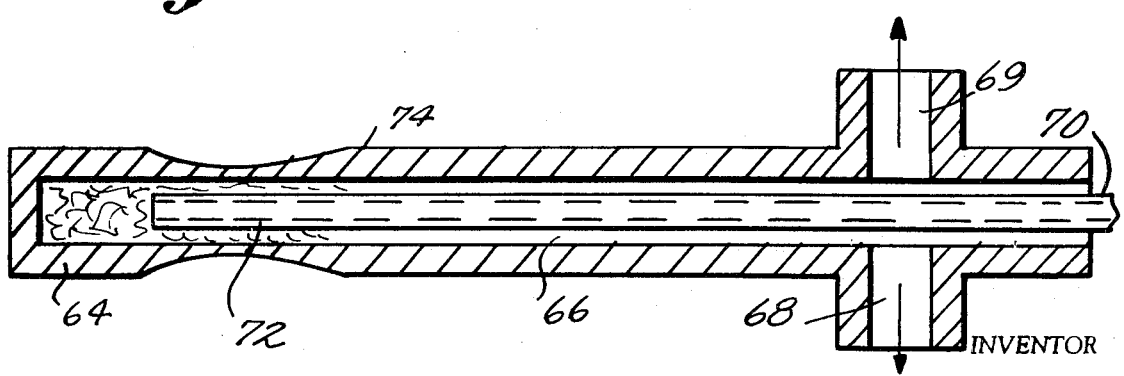
FIG. 6 shows a cutaway view of another embodiment of the invention whereby the burr has a closed end.

Moreover, as shown in FIG. 6, it is not necessary that the liquid from line 32 be injected directly onto the burr-tooth interface. Alternatively, the burr head may be closed, as shown in FIG. 6, and the fluid supplied by lines 30 and 32 simply evaporated in the region adjacent to this closed end of burr 64 to absorb the heat and then be drawn as a vapor back through the hollow passage 66 to be spun out through passages such as 68 and 69 to suitable lines connected to vacuum pumps or the like. In the arrangement of FIG. 6, a line 70 supplies the cooling liquid, which may be water based, through a static tube 72 which is mounted in the interior of the hollow burr-turbine assembly 74 shown in FIG. 6.

It should be apparent that the novel arrangement described above can be used to mill a variety of surfaces including tooth, bone, skin or frozen material, and any other suitable means of driving the burr such as an electrical motor or through a gear train can be readily employed to accomplish the goals of this invention and to provide adequate cooling in the manner described. Another variation of the embodiment shown above is the use of sintered burr heads which can allow the fluid to be expelled through open pore networks to result in an additional, useful characteristic for such operating of skin planning and bone contouring. Many other modifications and changes in the invention will be apparent and the scope of the invention is intended to be limited only by the scope of the appended claims.

What is claimed is:

1. A dental drill comprising:
  milling means for the removal of material,
  means for causing said milling means to remove said material,
  means for supplying liquid to said milling means, and
  means for creating a reduced pressure in the region to which said liquid is supplied so that said liquid is evaporated and for removing said evaporated liquid to cool said milling means.

2. A dental drill as in claim 1 wherein said material is tooth material.

3. A dental drill as in claim 1 wherein said causing means includes turbine means connected to said milling means and means for supplying a stream of air to said turbine means to cause said turbine means to rotate and rotate said milling means to remove said material.

4. A dental drill as in claim 3 wherein said turbine means and said milling means comprise an integral assembly.

5. A dental drill as in claim 4 including a housing having a hollow interior for containing said assembly so that said milling means protrudes from said housing and wherein said supplying means includes a source of liquid material and at least a single tube connecting said source to said milling means.

6. A dental drill as in claim 5 wherein said creating and removing means includes a vacuum pump and at least a single tube connecting said pump to said milling means to produce a reduced pressure in the region into which said liquid is supplied to cause said liquid to evaporate and to be withdrawn from said region as a vapor toward said pump.

7. A dental drill as in claim 6 wherein said milling means has at least a single aperture and said liquid is injected through said aperture onto the interface between said material and said milling means.

8. A dental drill as in claim 6 wherein said milling means has a closed end and said liquid is injected into the region adjacent said closed end.

9. A dental drill as in claim 6 wherein said milling means has at least a single aperture and including means for supplying medicating solutions to the interface between said material and said milling means.

10. A dental drill as in claim 9 wherein said solution supplying means includes a source of said solution and valve means adapted to connect said source of said solution to said tube connecting said pump to said milling means and disconnect said pump from said tube connecting said pump to said milling means so that said solution is supplied to said interface.

11. A method of removing material comprising the steps of:
  rotating a milling head in contact with said material to remove said material,
  supplying liquid to said milling head so that said liquid evaporates, and
  removing said evaporated liquid to cool said milling head.

12. A method as in claim 11 including the step of supplying a medicated solution to said material.

* * * * *